(12) United States Patent
Santos et al.

(10) Patent No.: US 8,402,461 B2
(45) Date of Patent: Mar. 19, 2013

(54) SWITCHING BETWEEN DIRECT MODE AND INDIRECT MODE FOR VIRTUAL MACHINE I/O REQUESTS

(75) Inventors: Jose Renato G Santos, San Jose, CA (US); Yoshio Turner, San Francisco, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 655 days.

(21) Appl. No.: 12/618,746

(22) Filed: Nov. 15, 2009

(65) Prior Publication Data

US 2011/0119665 A1    May 19, 2011

(51) Int. Cl.
   *G06F 9/455* (2006.01)
(52) U.S. Cl. .......................................... 718/1; 719/327
(58) Field of Classification Search .................. 718/1
   See application file for complete search history.

(56) References Cited

U.S. PATENT DOCUMENTS

| | | | | |
|---|---|---|---|---|
| 4,887,202 A | * | 12/1989 | Tanaka et al. | 703/21 |
| 7,613,847 B2 | * | 11/2009 | Kjos et al. | 710/22 |
| 7,904,914 B2 | * | 3/2011 | Green et al. | 719/321 |
| 2006/0005184 A1 | * | 1/2006 | Tewari et al. | 718/1 |
| 2009/0113422 A1 | * | 4/2009 | Kani | 718/1 |

OTHER PUBLICATIONS

Burger, Intel Virtualization Technology for Directed I/O (VT-d): Enhancing Intel platforms for efficient virtualization of I/O devices; Intel Software Network, Feb. 19, 2009, pp. 1-8.*
K. Mansley et al., "Getting 10 gb/s from Xen: Safe and fast device access from unprivileged domains," in Euro-Par 2007 Workshops: Parallel Processing, year 2007.
S. Varley et al., "I/O pass-through methodologies for mainstream virtualization usage," Intel Developer Forum IOSS003 presentation, year 2003.

* cited by examiner

Primary Examiner — Diem Cao

(57) ABSTRACT

A first virtual machine is implemented on one or more computing devices to generate input/output (I/O) requests to a hardware device. A second virtual machine is also implemented on the computing devices. A mechanism is to switch between a direct mode and an indirect mode without switching between a first context and a second context of the hardware device. In the direct mode, the I/O requests generated by the first virtual machine are to be sent to the hardware device without being redirected to the second virtual machine. In the indirect mode, the I/O requests generated by the first virtual machine are to be redirected to the second virtual machine for processing. The second virtual machine is to, after processing the I/O requests redirected to the second virtual machine, send the I/O requests to the hardware device.

11 Claims, 8 Drawing Sheets

SWITCHING BETWEEN DIRECT MODE AND INDIRECT MODE FOR VIRTUAL MACHINE I/O REQUESTS

BACKGROUND

An increasingly popular type of computer architecture is one that employs virtual machines. One or more computing devices host one or more virtual machines, each of which can correspond to a different end user. Each end user uses a terminal, or other type of client computing device that is communicatively connected to the computing devices, to provide input to a virtual machine and to receive output from the virtual machine. Processing of the input to generate the output, however, is handled by the computing devices that host the virtual machines. Each virtual machine has its own dedicated copy of an operating system, which is referred to as a guest operating system and that is installed at the computing devices. The terminals or other types of client computing devices thus perform limited or no processing functionality.

DETAILED DESCRIPTION

Figure 1:
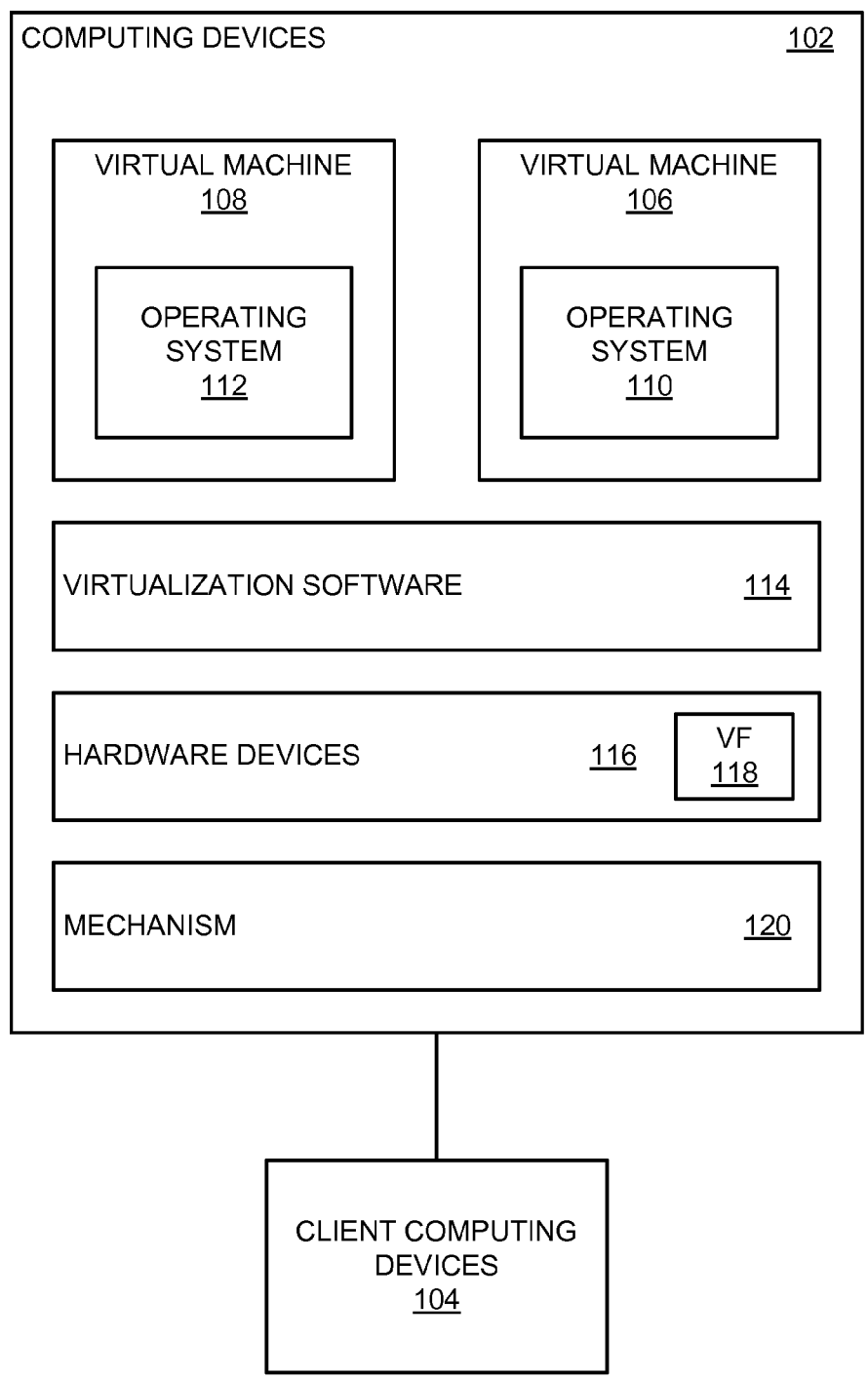
FIG. 1 is a diagram of a computing system, according to an example embodiment of the present disclosure.

As noted in the background section, virtual machines have become increasingly popular. Generally, the virtual machines hosted on one or more computing devices share the hardware resources of the computing devices. Input/output (I/O) requests from the virtual machines to the hardware resources may be processed in one or two different modes. In a direct mode, the I/O requests are directly sent from the virtual machines to the hardware resources, for enhanced performance. In an indirect mode, the I/O requests generated by the virtual machines are intercepted for additional processing before being sent to the hardware resources. The indirect mode permits enhanced I/O services to be provided, such as packet inspection, filtering, intrusion and virus detection, logging, and auditing, among other types of such services.

Many types of virtualization approaches that provide for virtual machines permit the virtual machines to interact with the hardware resources in just the direct mode or just the indirect mode. Switching between the direct mode and the indirect mode as desired or as needed is, therefore, unable to be accomplished. To overcome this problem, one limited solution permits switching between the direct mode and the indirect mode, where the indirect mode uses a different context than the direct mode, and where the context for the indirect mode is used to process I/O requests from multiple virtual machines. However, this solution is not ideal. In particular, using the same context for processing I/O requests from multiple virtual machines in the indirect mode can result in multiple copies of data being made, which results in additional processing overhead being incurred such that performance is reduced.

A context corresponds to a virtual function, which is provided by a particular hardware device to virtualize the functionality of the device. Traditionally, hardware devices exposed physical functions, such that for virtual machines to access the hardware devices, virtualization software interfaced the virtual machines to the hardware devices. By comparison, virtual functions exposed by hardware devices enable virtual machines to access the hardware devices directly, without such virtualization software interfacing the virtual machines to the hardware devices. In the prior art, then, there may be a first context corresponding to a first virtual function of a hardware device for the direct mode, and a second context corresponding to a second virtual function of the hardware device for the indirect mode. When switching between the indirect mode and the direct mode, a different virtual function is used.

The inventors have developed approaches to switch between the direct mode and the indirect mode that minimize performance penalties. In some example embodiments, the ownership of a virtual function is changed when switching between the direct mode and the indirect mode, instead of maintaining separate virtual functions for the different modes. In another example embodiment, a hardware switch is used to switch between the indirect mode and the direct mode. Thus, the present disclosure permits switching between the direct mode and the indirect mode without switching between contexts as in the prior art.

FIG. 1 shows a computing system 100, according to an example embodiment of the disclosure. The computing system includes one or more computing devices 102 and one or more client computing devices 104. Each of the computing devices 102 and 104 includes hardware, such as one or more processors, memory, input devices, output devices, network devices and other types of hardware devices, which are specifically called out in the computing device 102 as the hardware devices 116. Users provide input at the client computing devices 104, which is sent to the computing devices 102 for processing to generate output. The output is then sent from the computing devices 102 back to the client computing devices 104, at which the output is displayed for the users.

In this respect, the computing devices 102 include virtual machines 106 and 108 having operating systems 110 and 112, respectively, and that run on and that are implemented by the hardware of the computing devices 102. A virtual machine is an instance of an operating system along with one or more applications running in an isolated partition within the computing devices 102. Virtual machines permit the same or different operating systems to run on the same computing devices 102 at the same time while preventing the virtual machines from interfering with each other. Each virtual machine is considered a "machine within the machine" and functions as if it owned an entire computing device.

The operating systems 110 and 112 can be referred to as guest operating systems, and can be the same or different versions of the same or different operating systems. Such operating systems may include versions of the LINUX® operating system, where LINUX® is a trademark of Linus Torvalds. Such operating systems may further include versions of the Microsoft® Windows® operating system, where Microsoft® and Windows® are trademarks of Microsoft Corp., of Redmond, Wash.

The virtualization software 114 manages the virtual machines 106 and 108 and assists in the virtualization of hardware devices 116 for use by the virtual machines 106 and 108. The virtualization software 114 may also be referred to as a virtual machine monitor (VMM) or a hypervisor. An example of virtualization software 114 is Xen® virtual machine software, available from Citrix Systems, Inc., of Ft. Lauderdale, Fla. Another example of virtualization software 114 is VMware® virtual machine software, available from VMware, Inc., of Palo Alto, Calif. The virtualization software 114 manages the virtual machines 106 and 108 in that, among other things, the software 114 controls the instantiation, migration, and deletion of the virtual machines 106 and 108.

The hardware devices 116 can include hardware devices that provide virtual functions, such as the virtual function 118. The virtual function 118 virtualizes the functionality provided by a hardware device 116, to assist the virtualization software 114 in virtualizing the device 116 for use by the virtual machines 106 and 108. That is, the virtual machines 106 and 108 can access the hardware device 116 directly using the virtual function 118, instead having to access the hardware device 116 more indirectly, via or through the virtualization software 114. The virtual function 118 can in one example embodiment be a peripheral component interconnect (PCI) Express (PCIe) virtual function that is provided or exposed by a PCIe device hardware where the device is single root input/output virtualization (SR-IOV) capable.

The operation of a virtual machine in either a direct mode or an indirect mode is described herein in relation to I/O requests generated by the virtual machine 106 that are intended for the hardware device 116 providing the virtual function 118. The virtualization approach within the computing system 100 permits the virtual machines 106 and 108 to operate in a direct mode or an indirect mode, and to switch between these two modes. In the direct mode, the virtual function 118 is owned by the virtual machine 106, whereas in the indirect mode, the virtual function 118 is owned by the virtual machine 108. More specifically, in the direct mode, I/O requests generated by the virtual machine 106 are sent directly to the virtual function 118 of the hardware device 116. In the indirect mode, by comparison, I/O requests generated by the virtual machine 106 are intercepted by the virtual machine 108, which processes the I/O requests before sending the I/O requests to the virtual function 118 of the hardware device 116.

The mechanism 120 runs on the computing devices 102, and switches between the direct mode and indirect mode. The mechanism 120 may be considered as being implemented in software, hardware, or a combination of software and hardware. Thus, the mechanism 120 can switch operation from the direct mode to the indirect mode, so that the I/O requests generated by the virtual machine 106 are intercepted by the virtual machine 108, as well as from the indirect mode to the direct mode, so that the I/O requests generated by the virtual machine 106 are not intercepted by the virtual machine 108. Three particular example embodiments of the present disclosure are now described, in relation to which the mechanism 120 can be implemented to achieve switching between the direct mode and the indirect mode.

Figure 2:
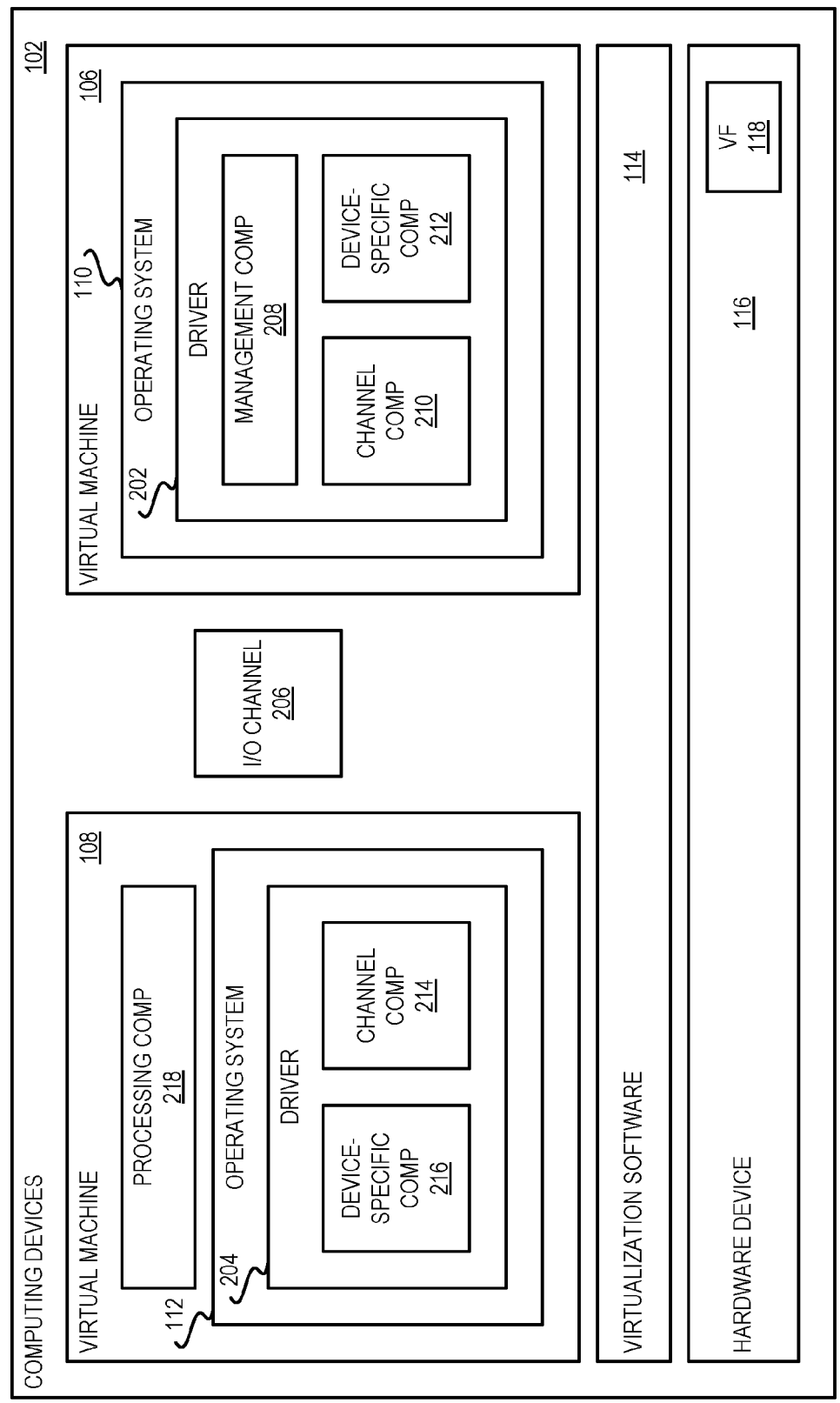
FIG. 2 is a diagram of a computing device, according to an example embodiment of the disclosure.

FIG. 2 shows one approach for switching between the direct mode and the indirect mode, according to an example embodiment of the disclosure. Just the computing devices 102 are depicted in FIG. 2. Operation of the direct mode and the indirect mode is described explicitly in relation to I/O requests, although the modes operate the same for I/O responses to the I/O requests, just in reverse.

The mechanism 120 of FIG. 1 is said to include a driver 202 of the operating system 110 of the virtual machine 106, a driver 204 of the operating system 112 of the virtual machine 108, the constituent components of the drivers 202 and 204, and an I/O channel 206 communicatively connecting the virtual machines 106 and 108. Functionality ascribed to I mode switching in relation to FIG. 2 is thus considered to be performed by the mechanism 120 of FIG. 1. The driver 202 includes a management component 208, a channel component 210 communicatively connected to the I/O channel 206, and a device-specific component 212, the latter particular to and communicatively connected to the hardware device 116. The driver 204 includes a channel component 214 communicatively connected to the I/O channel 206, and a device-specific component 216, the latter also particular to and communicatively connected to the hardware device 116. The virtual machine 108 also includes a processing component 218 that may be external to the operating system 112 as is shown in FIG. 2.

In the direct mode, I/O requests generated at the virtual machine 106, such as by application computer programs running on the virtual machine 106 in conjunction with the operating system 110, are sent by the driver 202 to the hardware device 116 without being intercepted by the virtual machine 108. More specifically, the management component 208 receives the I/O requests generated at the virtual machine 106. In the direct mode, the management component 208 directs the I/O requests to the device-specific component 212, which is a driver for the hardware device 116. The device-specific component 212 then sends the I/O requests to the hardware device 116, and in this sense is communicatively connected to the hardware device 116.

In the indirect mode, I/O requests generated at the virtual machine 106 are sent by the driver 202 over the I/O channel 206, from which the driver 204 receives the I/O requests. The driver 204 directs the I/O requests to the processing component 218 so that the virtual machine 108 processes the I/O requests prior to the I/O requests being sent to the hardware device 116. After having been processed, the I/O requests are sent from the driver 204 to the hardware device 116. As such, the virtual machine 108 intercepts the I/O requests from the virtual machine 106 for processing prior to the I/O requests being received by the hardware device 116.

Figure 3:
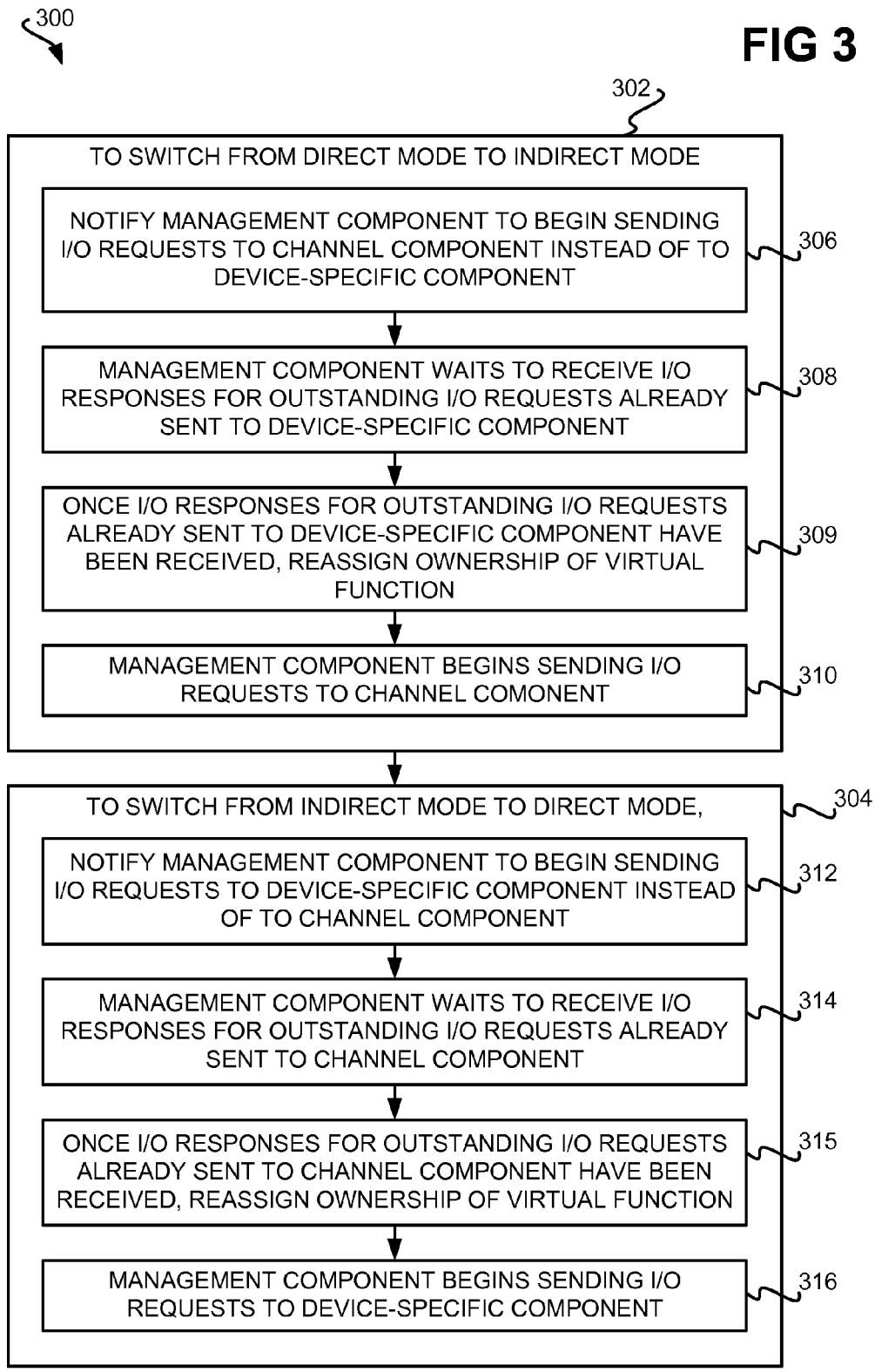
FIG. 3 is flowchart of a method for switching between an indirect mode and a direct mode within the computing device of FIG. 2, according to an example embodiment of the disclosure.

FIG. 3 shows a method 300 for switching between the direct mode and the indirect mode in FIG. 2, according to an example embodiment of the disclosure. The method 300 is generally said to be performed by the mechanism 120 of FIG. 1, which has various constituent components as has been described in relation to FIG. 2. Part 302 is performed to switch from the direct mode to the indirect mode, whereas part 304 is performed to switch from the indirect mode to the direct mode.

To switch from the direct mode to the indirect mode (302), the management component 208 of the driver 202 of the virtual machine 106 is notified to begin sending I/O requests to the channel component 210 of the driver 202 instead of to the device-specific component 212 (306). The management component 208 may first wait to receive I/O responses for outstanding I/O requests that have already been sent to the device-specific component 212 (308). Once I/O responses have been received for the outstanding I/O requests already sent to the device-specific component 212, the ownership of the virtual function 118 is reassigned from the virtual machine 106 to the virtual machine 108 (309). The management component 208 then begins sending (new) I/O requests to the channel component 210 (310). As such, I/O requests are then sent to the virtual machine 108 over the I/O channel 206 between the virtual machines 106 and 108.

Similarly, to switch from the indirect mode to the direct mode (304), the management component 208 is notified to begin sending I/O requests to the device-specific component 212 instead of to the channel component 210 (312). The management component 208 may first wait to receive I/O responses for outstanding I/O requests that have already been sent to the channel component 210 (314). Once I/O responses have been received for the outstanding I/O requests already sent to the channel component 210, the ownership of the virtual function 118 is reassigned from the virtual machine 108 to the virtual machine 106 (315). The management component 208 then begins sending (new) I/O requests to the device-specific component 212 (316). As such, I/O requests are the sent directly to the hardware device 116, instead of to the virtual machine 108 first.

Thus, where the hardware device 116 is a PCIe device or other type of device that has a virtual function 118, the virtual function 118 has its ownership reassigned when switching between the direct mode and the indirect mode in parts 309 and 315. In particular, when switching from the indirect mode to the direct mode in part 304, the ownership of the virtual function 118 is assigned to the virtual machine 106 in part 315. By comparison, when switching from the direct mode to the indirect mode in part 302, the ownership of the virtual function 118 is assigned to the virtual machine 108 in part 315. This is unlike the prior art, in which there are two virtual functions. In the prior art, one virtual function is assigned to the I/O request-originating virtual machine (e.g., the virtual machine 106) and is used in the direct mode, and another virtual function is assigned to the I/O request-intercepting virtual machine (e.g., the virtual machine 108) and is used in the indirect mode.

It is noted that in the example embodiment of FIGS. 2 and 3, there is no switching between contexts to switch between the indirect mode and the direct mode. Rather, the ownership of the same virtual function 118 is reassigned to the virtual machine 108 when switching to the indirect mode, and is reassigned to the virtual machine 106 when switching to the direct mode. Insofar as contexts correspond to different virtual functions, as described above, there is thus no switching between contexts, because the same virtual function 118 is used in both the indirect mode and in the direct mode.

Figure 4:
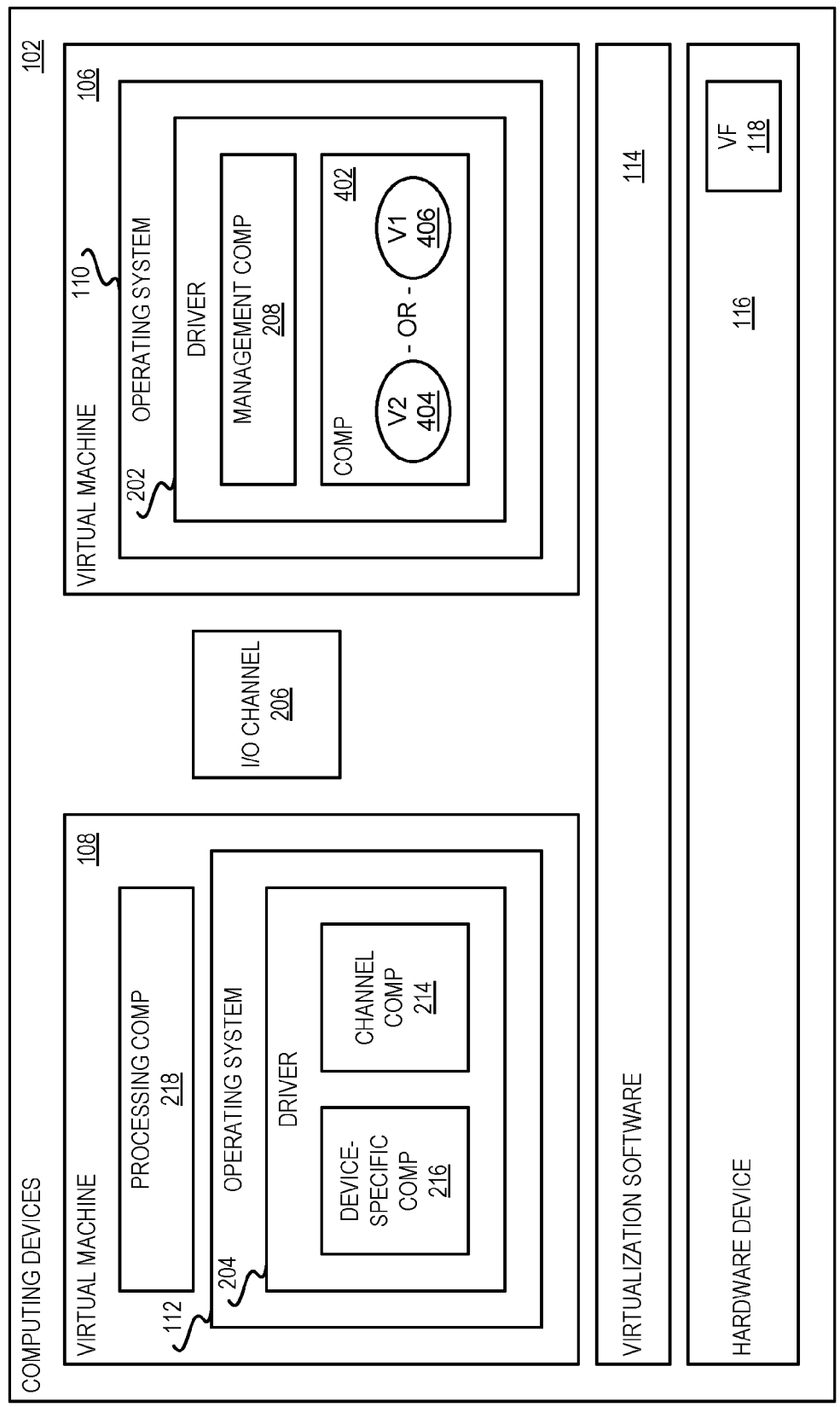
FIG. 4 is a diagram of a computing device, according to another example embodiment of the present disclosure.

FIG. 4 shows another approach for switching between the direct mode and the indirect mode, according to an example embodiment of the disclosure. Just the computing devices 102 are depicted in FIG. 4. Operation of the direct mode and the indirect mode is described explicitly in relation to I/O requests, although the modes operate the same for I/O responses to the I/O requests, just in reverse.

The mechanism 120 of FIG. 1 is said to include a driver 202 of the operating system 110 of the virtual machine 106, a driver 204 of the operating system 112 of the virtual machine 108, the constituent components of the drivers 202 and 204, and an I/O channel 206 communicatively connecting the virtual machines 106 and 108. Functionality ascribed to mode switching in relation to FIG. 2 is thus considered to be performed by the mechanism 120 of FIG. 1. The driver 202 includes a management component 208, a channel component 210 communicatively connected to the I/O channel 206, and a device-specific component 212, the latter particular to and communicatively connected to the hardware device 116.

The driver 204 includes a channel component 214 communicatively connected to the I/O channel 206, and a device-specific component 216, the latter also particular to and communicatively connected to the hardware device 116. The virtual machine 108 also includes a processing component 218 that may be external to the operating system 112 as is shown in FIG. 2.

The component 402 that is installed within the driver 202 of the operating system 110 of the virtual machine 106 can either have or be the version 404 or the version 406. Just one of the versions 404 and 406 of the component 402 is present within the driver 202 at any given time. The version 404 of the component 402 is replaced by the version 406 via a technique known as code injection, in which the computer code of the version 406 of the component 402 is injected into the driver 202. Likewise, the version 406 of the component 402 is replaced by the version 404 via code injection, in which the computer code of the version 404 of the component 402 is injected into the driver 202.

The version 404 of the component 402 is akin to the channel component 210 of FIG. 2. Thus, the version 404 of the component 402 is communicatively connected to the I/O channel 206 to transmit I/O requests over the I/O channel in the indirect mode. The version 406 of the component 402 is akin to the device-specific component 212 of FIG. 2. Thus, the version 406 of the component 402 is a device driver for and particular to the hardware device 116, and is communicatively connected to the hardware device 116 through the virtualization software 114, to transmit I/O requests to the device 116 without passing the I/O requests through the virtual machine 108.

In both the direct mode and the indirect mode, I/O requests generated at the virtual machine 106 are received by the management component 208. The management component 208 transmits the I/O requests to the component 402. The management component 208 does not have to be aware of in which mode the virtual machine 106 is currently operating, because just one version of the component 402 is present within the virtual machine 106 at any given time.

In the direct mode, I/O requests generated at the virtual machine 106 are sent by the driver 202 to the hardware device 116 without being intercepted by the virtual machine 108. Specifically, the management component 208 receives the I/O requests and transmits the I/O requests to the component 402, where the version 406 of the component 402 is currently present instead of the version 404 of the component 402. The version 406 of the component 402, which operates similar to the device-specific component 212 of FIG. 2, sends the I/O requests to the hardware device 116.

In the indirect mode, I/O requests generated at the virtual machine 106 are sent by the driver 202 over the I/O channel 206, from which the driver 204 receives the I/O requests. The driver 204, as in FIG. 2, directs the I/O requests to the processing component 218 to process the I/O requests prior to the I/O requests being sent to the hardware device 116. After having been processed, the I/O requests are sent from the driver 204 to the hardware device 116.

In the indirect mode more specifically, the management component 208 receives the I/O requests and transmits the I/O requests to the component 402 no differently than in the direct mode. In the indirect mode, the version 404 of the component 402 is present instead of the version 406 of the component 402, as was present in the direct mode. The version 404 of the component 402, which operates similar to the channel component 210 of FIG. 2, sends the I/O requests over the I/O channel 206, from which the channel component 214 receives the I/O requests. The channel component 214 directs the I/O requests to the processing component 218, which processes and then sends the I/O requests to the device-specific component 216. The device-specific component 216 then sends the I/O requests, as have been processed, to the hardware device 116.

Figure 5:
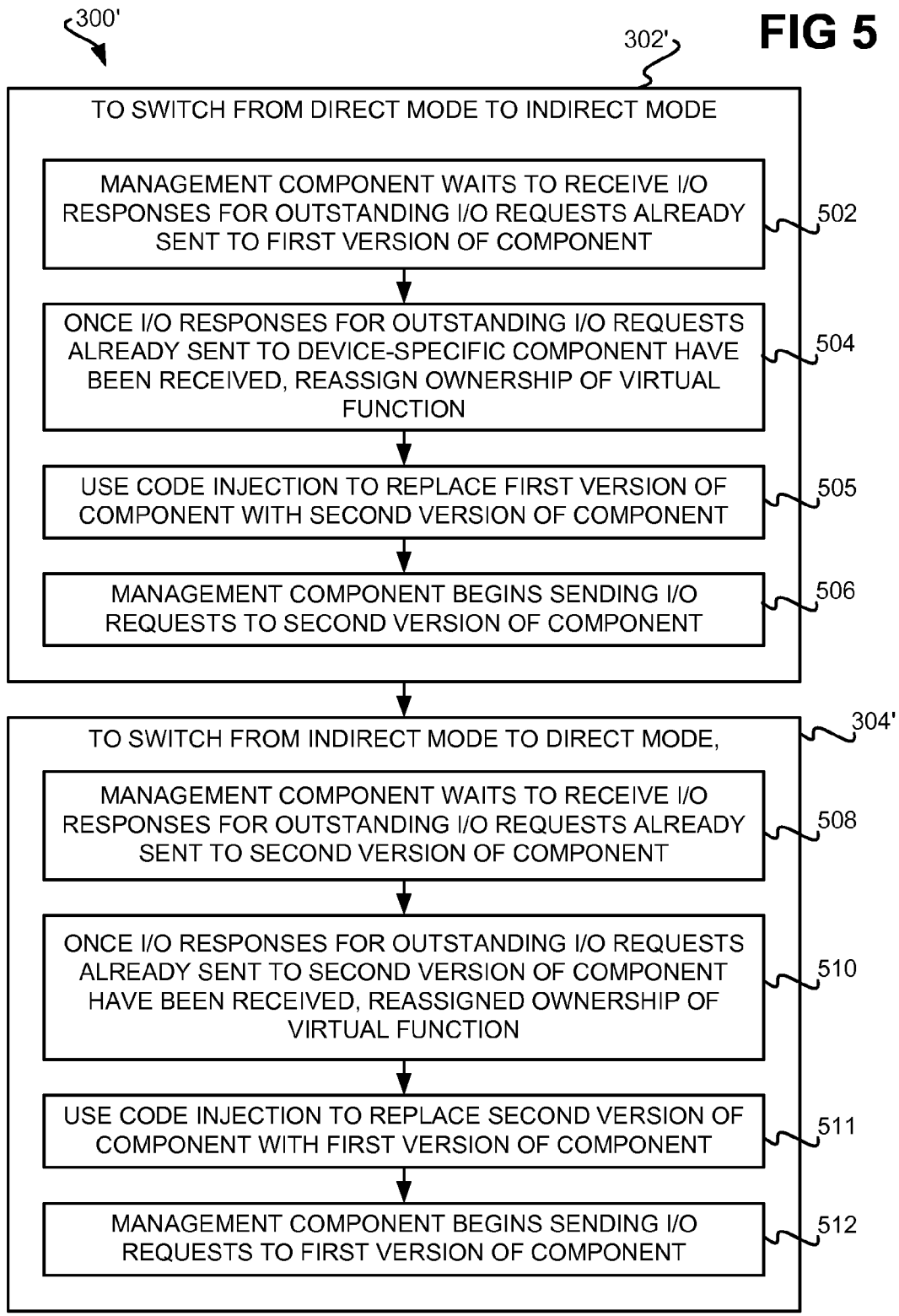
FIG. 5 is flowchart of a method for switching between an indirect mode and a direct mode within the computing device of FIG. 4, according to an example embodiment of the disclosure.

FIG. 5 shows a method 300' for switching between the direct mode and the indirect mode in FIG. 4, according to an example embodiment of the disclosure. The method 300' is generally said to be performed by the mechanism 120 of FIG. 1, which has various constituent components as has been described in relation to FIG. 4. Part 302' is performed to switch from the direct mode to the indirect mode, whereas part 304' is performed to switch from the indirect mode to the direct mode.

To switch from the direct mode to the indirect mode (302'), the management component 208 of the driver 202 of the virtual machine 106 may first wait to receive I/O responses for outstanding I/O requests already sent to the first version 406 of the component 402 (502). Once I/O responses have been received for the outstanding I/O requests already sent to the first version 406 of the component 402, the ownership of the virtual function is reassigned from the virtual machine 106 to the virtual machine 108 (504). Code injection is then used to replace the first version 406 of the component 402 with the second version 404 of the component 402 (505). The management component 208 then begins sending (new) I/O requests to the second version 404 of the component 402 (506). As such, I/O requests are then sent to the virtual machine 108 over the I/O channel 206.

Similarly, to switch from the indirect mode to the direct mode (304'), the management component 208 of the driver 202 may first wait to receive I/O responses for outstanding I/O requests already sent to the second version 404 of the component 402 (508). Once I/O responses have been received for the outstanding I/O requests already sent to the second version 404 of the component 402, the ownership of the virtual function is reassigned from the virtual machine 108 to the virtual machine 106 (510). Code injection is then used to replace the second version 404 of the component 402 with the first version 406 of the component 402 (511). The management component 208 then begins sending (new) I/O requests to the first version 406 of the component 402 (512). As such, I/O requests are sent directly to the hardware device 116, instead of to the virtual machine 108 first.

The difference between the example embodiments of FIGS. 2 and 3 and the example embodiments of FIGS. 4 and 5 is that in FIGS. 2 and 3 both the channel component 210 and the device-specific component 212 are present within the virtual machine 106, whereas in FIGS. 4 and 5 just one version 404 or 406 of the component 402 is present at any time within the virtual machine 106. In FIGS. 2 and 3, the channel component 210 may have to be present in addition to the device-specific component 212 before the virtual machine 106 is started so that subsequent switching from the direct mode to the indirect mode can occur. By comparison, in FIGS. 4 and 5, the version 404 of the component 402 can replace the initially installed version 406 of the component 402 while the virtual machine 106 is actively running, via code injection, to switch from the direct mode to the indirect mode.

As in FIGS. 2 and 3, where the hardware device 116 is a PCIe or other type of device that has a virtual function 118 in FIGS. 4 and 5, the virtual function 118 has its ownership reassigned when switching from the direct mode to the indirect mode, and vice-versa. In particular, when switching from the indirect mode to the direct mode, the ownership of the virtual function 118 is assigned to the virtual machine 106. By comparison, when switching from the direct mode to the indirect mode, the ownership of the virtual function 118 is assigned to the virtual machine 108.

Code injection is thus utilized in FIGS. 4 and 5 to replace the version of the component 402 with a different version of the component 402. Code injection is advantageously leveraged by the present disclosure in a way in which code injection was not originally intended, and in this sense provides for unexpected results in utilizing virtualization techniques that employ such code injection. In particular, existing virtualization techniques use code injection to add a hardware-specific driver within a virtual machine, so that when the virtual machine is first run, not all the drivers have to be a priori present within the virtual machine. By comparison, the inventors have leveraged code injection to effectively switch between the direct and indirect modes as well.

As in the example embodiment of FIGS. 2 and 3, it is noted that in the example embodiment of FIGS. 4 and 5, there is no switching between contexts to switch between the indirect mode and the direct mode. Rather, the ownership of the same virtual function 118 is reassigned to the virtual machine 108 when switching to the indirect mode, and is reassigned to the virtual machine 106 when switching to the direct mode. Insofar as contexts correspond to different virtual functions, as described above, there is thus no switching between contexts, because the same virtual function 118 is used in both the indirect mode and in the direct mode.

Figure 6:
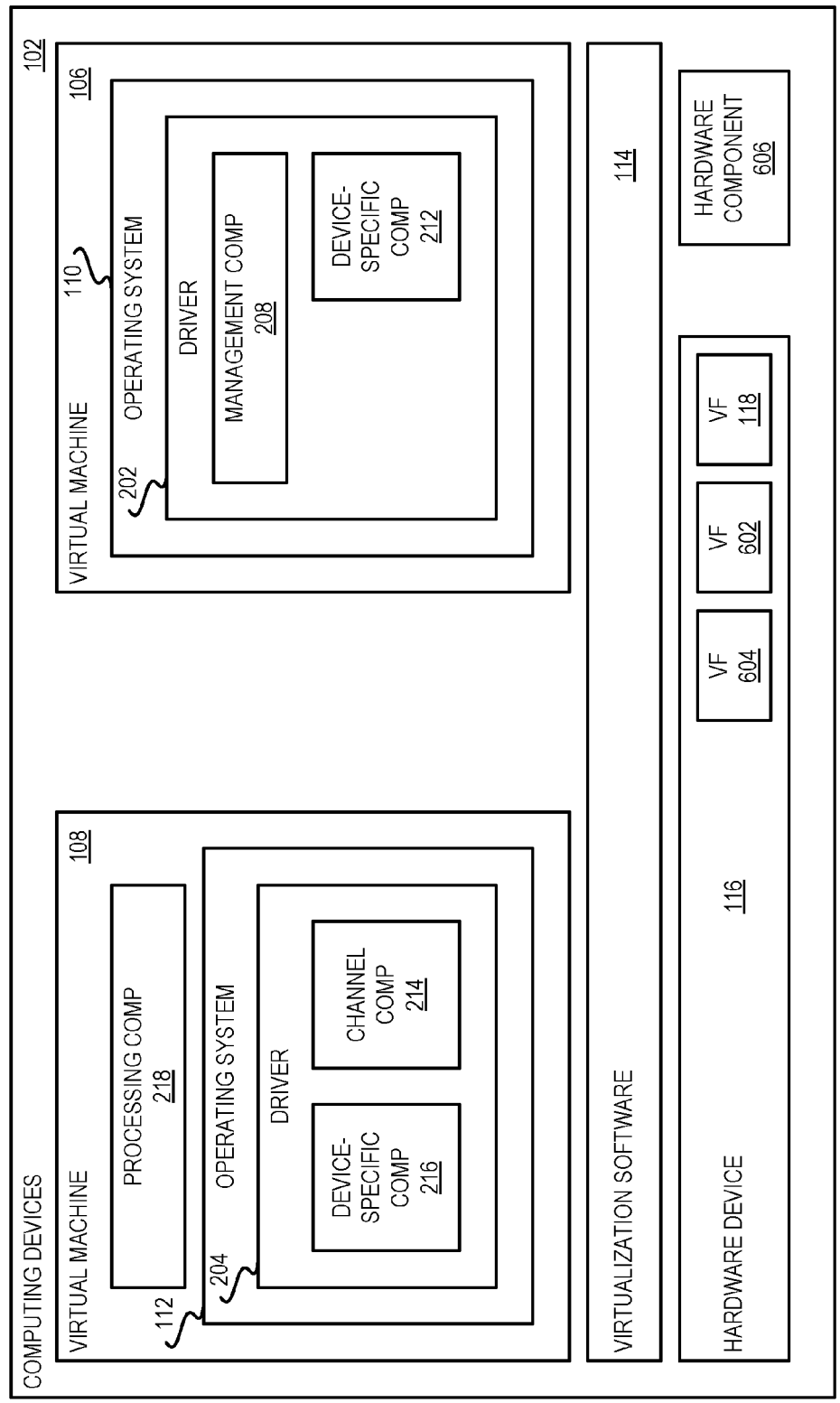
FIG. 6 is a diagram of a computing device, according to still another example embodiment of the present disclosure.

FIG. 6 shows a third approach for switching between the direct mode and the indirect mode, according to an example embodiment of the disclosure. Just the computing devices 102 are depicted in FIG. 6. The approach for switching between the direct mode and the indirect mode is described in FIG. 6 in relation to the representative hardware device 116 having the virtual functions 602 and 604, in addition to having the virtual function 118. As in FIGS. 2 and 4, operation of the direct mode and the indirect mode is explicitly described in relation to I/O requests, although the modes operate the same for I/O responses to the I/O requests, just in reverse.

The mechanism 120 is said to include the virtual functions 118, 602, and 604, the driver 204 of the virtual machine 108, the constituent components of the driver 204, and a hardware component 606, such as a hardware switch. The mechanism 120 may also include the driver 202 of the virtual machine 106 and the constituent components of the driver 202. Functionality ascribed to redirection and mode switching in relation to FIG. 6 is thus considered to be performed by the mechanism 120 of FIG. 1. The driver 202 includes the management component 208 and the device-specific component 212. The driver 204 includes the driver-specific component 216. The virtual machine 108 further includes the processing component 218, as in FIGS. 2 and 4.

The virtual function 118 is owned by the virtual machine 106, and is not owned or shared by the virtual machine 108. By comparison, the virtual functions 602 and 604 are owned by the virtual machine 108, and are not owned or shared by the virtual machine 106. As such, none of the virtual functions 118, 602, and 604 are shared at any given time by both the virtual machines 106 and 108.

In the direct mode, I/O requests generated at the virtual machine 106 are sent by the driver 202 to the virtual function 118, which sends the I/O requests to the hardware component 606. The hardware component 606 is programmed to relay the I/O requests directly back to the hardware device 116, without interception by the virtual machine 108. More specifically, the management component 208 receives the I/O requests generated at the virtual machine 106, and directs the I/O requests to the device-specific component 212. The device-specific component 212 then sends the I/O requests to the virtual function 118, which sends the I/O requests to the hardware component 606. The hardware component 606 is programmed in the direct mode to relay the I/O requests back to the hardware device 116. The hardware device 116 then processes the I/O requests.

In the indirect mode, I/O requests generated at the virtual machine 106 are again sent by the driver 202 to the virtual function 118, which again sends the I/O requests to the hardware component 606. However, the hardware component 606 is programmed in the indirect mode to relay the I/O requests to the virtual function 602, which redirects the I/O requests to the virtual machine 108 before the hardware device 116 processes the I/O requests, so that the virtual machine 108 processes the I/O requests first. In this manner, the virtual machine 108 intercepts the I/O requests generated at the virtual machine 106.

In the indirect mode more specifically, the management component 208 receives the I/O requests generated at the virtual machine 106 and directs the I/O requests to the device-specific component 212, which sends the I/O requests to the virtual function 118, no differently than in the direct mode. However, rather than the hardware component 606 relaying the I/O requests back to the hardware device 116, the hardware component 606 instead relays the I/O requests to the virtual function 602. The virtual function 602 transmits the I/O requests to the device-specific component 216 of the virtual machine 108. The device-specific component 216 transmits the I/O requests to the processing component 218. The processing component 218 processes the I/O requests, and then returns the I/O requests back to the device-specific component 216, which transmits the I/O requests to the virtual function 604. At that time, the hardware device 116 processes the I/O requests, upon receipt by the third virtual function 604.

Figure 7:
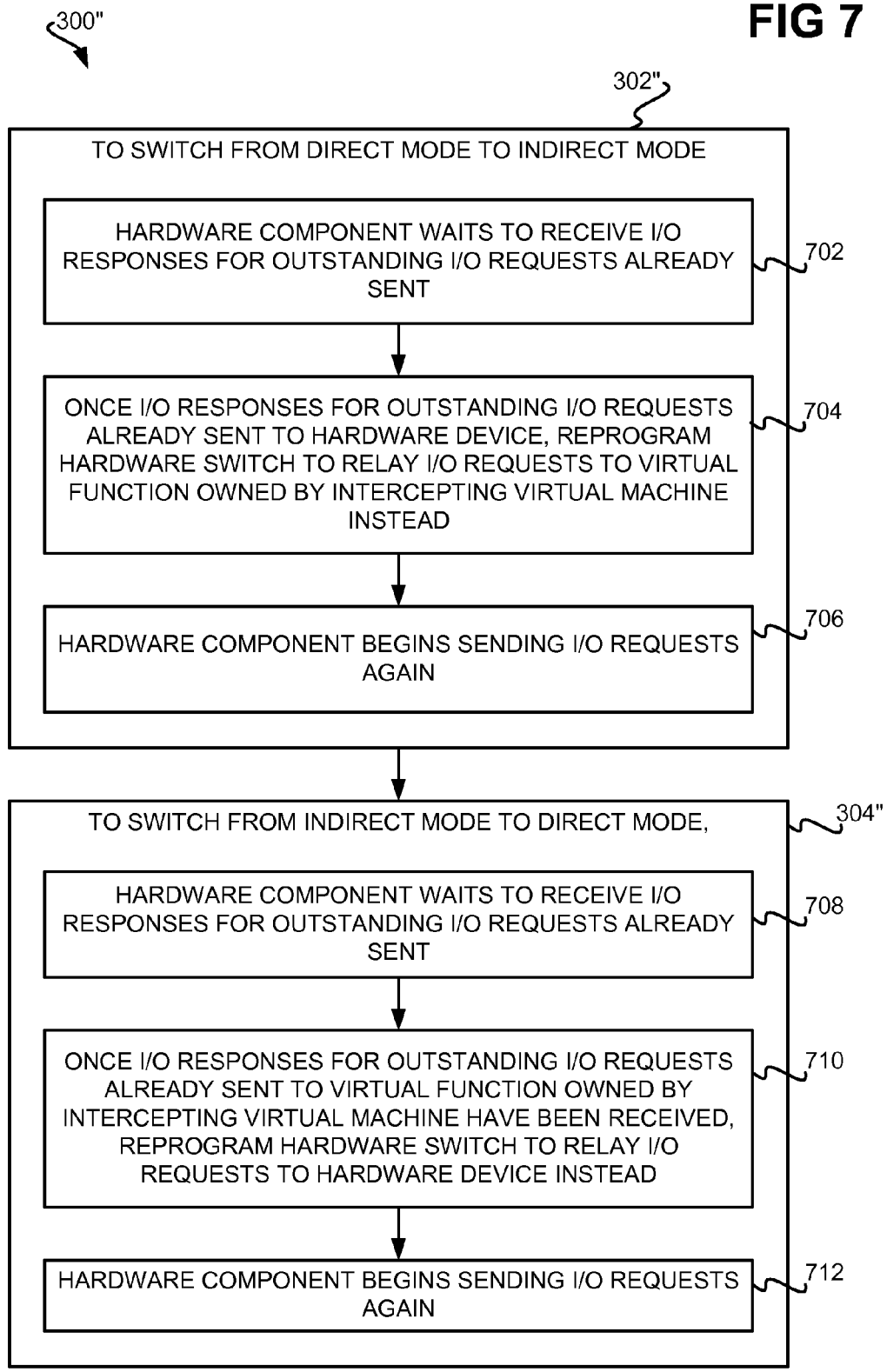
FIG. 7 is a flowchart of a method for switching between an indirect mode and a direct mode within the computing device of FIG. 6, according to an example embodiment of the disclosure.

FIG. 7 shows a method 300" for switching between the direct mode and the indirect mode in FIG. 6, according to an example embodiment of the disclosure. The method 300" is generally said to be performed by the mechanism 120 of FIG. 1, which has various constituent components as has been described in relation to FIG. 6. Part 302" is performed to switch from the direct mode to the indirect mode, whereas part 304" is performed to switch from the indirect mode to the direct mode.

To switch from the direct mode to the indirect mode (302"), the hardware component 606 may first wait to receive I/O responses for outstanding I/O requests already sent directly to the hardware device 116 from the virtual function 118 (702). Once I/O responses have been received for the outstanding I/O requests already sent to the hardware device 116, the hardware switch 606 is reprogrammed to send I/O requests from the virtual function 118 to the virtual function 602 instead of to the hardware device 116 directly (704). The hardware component 606 then begins sending I/O requests from the virtual function 118 to the virtual function 602 instead of back to the hardware device 116 (706).

To switch from the indirect mode to the direct mode (304"), the hardware component 606 again may first wait to receive I/O responses for outstanding I/O requests already sent to the virtual function 602 from the virtual function 118 (708). Once I/O responses have been received for the outstanding I/O requests already sent to the virtual function 602, the hardware switch 116 is reprogrammed to send I/O requests from the virtual function 118 to the hardware device 116 directly, instead of to the virtual function 602 (710). The hardware component 606 then begins sending I/O requests from the virtual function 118 back to the hardware device 116 directly, instead of to the virtual function 602 (712).

The virtual machine 106 itself operates no differently in the indirect mode as compared to the direct mode. In this way, the example embodiment of FIGS. 6 and 7 differs from the example embodiments of FIGS. 2-3 and 4-5 that have been described, in which the virtual machine 106 operates differently in the indirect mode as compared to the direct mode. Whereas the example embodiments of FIGS. 2-3 and 4-5 redirect I/O requests from the virtual machine 106 to the virtual machine 108 over the I/O channel 206, in the example embodiment of FIGS. 6-7 an I/O channel does not have to be present. I/O requests are instead redirected in FIGS. 6-7 by the hardware switch 606. The hardware switch 606 thus receives the I/O requests from the virtual function 118 (as sent by the virtual machine 106), and in the direct mode relays the I/O requests back to the hardware device 116 directly, and in the indirect mode relays the I/O requests to the virtual function 602, which sends the I/O requests to the virtual machine 108.

As noted above, the hardware component 606 can be a hardware switch. A hardware switch is conventionally used to process an I/O request from a virtual machine in one of two ways. First, if the I/O request is intended for another virtual machine running on the same computing device, then the hardware switch routes the I/O request internally to this other virtual machine. Second, if the I/O request is not intended for another virtual machine running on the same computing device, then the hardware switch routes the I/O request externally, outside of the computing device.

By comparison, the hardware switch is advantageously leveraged by the present disclosure in a way in which the hardware switch was not originally intended, and in this sense provides for unexpected results in utilizing such a hardware switch. In particular, the hardware switch is programmed in the indirect mode to relay all I/O requests sent to the virtual function 118 by the virtual machine 106 to the virtual function 602, regardless of whether these I/O requests are intended for a virtual machine running on the same computing device or not. That is, whereas conventionally a hardware switch is programmed to forward I/O requests based on their intended destination, the present disclosure programs the hardware switch in the indirect mode to forward I/O requests to the virtual function 602 from the virtual function 118 regardless of their intended destination.

Furthermore, the virtual functions 118, 602, and 604 as used in FIGS. 6 and 7 are advantageously leveraged by the present disclosure in a way in which the virtual functions 118, 602, and 604 were not originally intended, and in this sense provide for unexpected results in utilizing virtualization techniques in relation to hardware devices that provide such virtual functions. In particular, existing virtual techniques employ the virtual functions of hardware devices to bypass the virtualization software (e.g., the virtualization software 114 of FIG. 1) when virtual machines access the hardware devices. By comparison, the inventors have leveraged the virtual functions 118, 602, and 604 for switching between direct mode and indirect mode as well.

It is noted that in the example embodiment of FIGS. 6 and 7, there is no also switching between contexts to switch between the indirect mode and the direct mode. When contexts are switched between, as in the prior art, a virtual machine sends its I/O requests to a different virtual function of the hardware device 116 depending on whether the direct mode or the indirect mode is currently operative. By comparison, in the example embodiment of FIGS. 6 and 7, the virtual machine 106 sends its I/O requests to the virtual function 118 regardless of whether the direct mode or the indirect mode is currently operative—there is thus no context switching. The virtual function 118 is programmed to send the I/O requests to the hardware component 606 regardless of which mode is currently operative. In the direct mode, the component 606 relays the I/O requests directly to the hardware device 116, whereas in the indirect mode, the component 608 relays the I/O requests to the virtual function 602 for processing by the virtual machine 108, which then sends the I/O requests to the virtual function 604.

Figure 8:
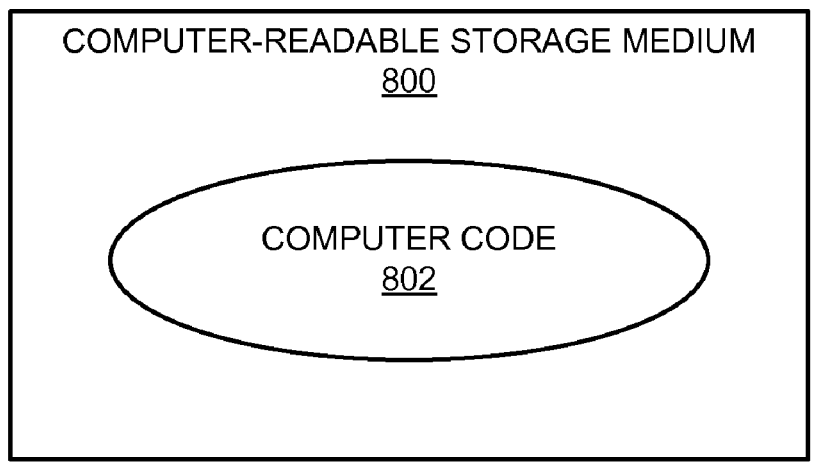
FIG. 8 is a diagram of a computer-readable medium, according to an example embodiment of the present disclosure.

In conclusion, FIG. 8 shows a rudimentary computer-readable storage medium 800, according to an example embodiment of the disclosure. The computer-readable storage medium 800 may be a volatile or a non-volatile storage medium. An example of volatile computer-readable storage media is dynamic random access memory (DRAM), among other types of volatile semiconductor memory. Examples non-volatile computer-readable storage media include magnetic media, such as hard disk drives, optical media, such as optical discs, and non-volatile semiconductor memory, such as flash memory.

The computer-readable storage medium 800 has stored thereon computer code 802. The computer code 802 is executable by one or more processors of one or more computing devices. Execution of the computer code 802 performs a method in relation to two virtual machines, such as the virtual machines 106 and 108, which are implemented on one or more computing devices, such as the computing devices 102. The method specifically provides a mechanism to redirect I/O requests generated by the first virtual machine for a hardware device, such as the hardware device 116, to the second virtual machine. The mechanism that is provided by this method can be the mechanism 120 of FIG. 1, which can be implemented in various example embodiments as has been described in relation to FIGS. 2-3, 4-5, and 6-7.

We claim:

1. A system comprising:
one or more computing devices;
a hardware device;
a first virtual machine implemented on a first of the computing devices to generate input/output (I/O) requests to the hardware device;
a second virtual machine implemented on a second of the computing devices;
a mechanism to switch between a direct mode and an indirect mode without switching between a first context and a second context of the hardware device,
wherein in the direct mode, the I/O requests generated by the first virtual machine are to be sent to the hardware device without being redirected to the second virtual machine,
wherein in the indirect mode, the I/O requests generated by the first virtual machine are to be redirected to the second virtual machine for processing, and the second virtual machine is to, after processing the I/O requests redirected to the second virtual machine, send the I/O requests to the hardware device,
wherein to switch from the direct mode to the indirect mode, the mechanism is to replace a first version of a component of a first driver of the first virtual machine with a second version of the component, the first version particular to the hardware device to transmit the I/O requests without passing through the second virtual machine the second version to transmit the I/O requests to the second virtual machine over an I/O channel.

2. The system of claim 1, wherein in the indirect mode, the hardware device is to generate I/O responses to the I/O requests, the second virtual machine is to receive the I/O responses from the hardware device and is to process the I/O responses before sending the I/O responses to the first virtual machine.

3. The system of claim 1, wherein the hardware device is to provide a virtual function that virtualizes functionality of the hardware device,
wherein the mechanism is to switch from the direct mode to the indirect mode by reassigning ownership of the virtual function from the first virtual machine to the second virtual machine,
and wherein the mechanism is to switch from the indirect mode to the direct mode by reassigning ownership of the virtual function from the second virtual machine to the first virtual machine.

4. The system of claim 3, wherein the mechanism comprises:
the I/O channel between the first virtual machine and the second virtual machine;
the first driver at the first virtual machine to send the I/O requests generated by the first virtual machine over the I/O channel; and,
a second driver at the second virtual machine to receive the I/O requests sent by the first driver over the I/O channel.

5. The system of claim 4,
wherein the first driver comprises:
the component having the first version and the second version such that just one of the first and the second versions is present within the first driver at any given time and such that the first version is replaced by the second version and the second version is replaced by the first version,
the first version of the component being particular to the hardware device and communicatively connected to the hardware device to transmit the I/O requests to the hardware device without passing through the second virtual machine,
the second version of the component communicatively connected to the I/O channel to transmit the I/O requests over the I/O channel;
a management component to receive the I/O requests from within the first virtual machine and to direct the I/O requests to the component such the I/O requests are transmitted to the first version of the component when the first version is present in the direct mode and such that the I/O requests are transmitted to the second version of the component when the second version is present in the indirect mode;
wherein the second driver comprises:
a channel component communicatively connected to the I/O channel to receive the I/O requests sent over the I/O channel by the second version of the component in the indirect mode;
a device-specific component that is particular to the hardware device and that is communicatively connected to the hardware device, to send the I/O requests received over the I/O channel by the channel component in the indirect mode to the hardware device after the second virtual machine processes the I/O requests,
and wherein the mechanism is to switch from the indirect mode to the direct mode by replacing the second version of the component of the first driver with the first version of the component of the first driver.

6. A method comprising:
switching between a direct mode and an indirect mode without switching between a first context and a second context of a hardware device, wherein in the direct mode, I/O requests generated by a first virtual machine are to be sent to the hardware device without being redirected to a second virtual machine, wherein in the indirect mode, the I/O requests generated by the first virtual machine are to be redirected to the second virtual machine for processing, and the second virtual machine is to, after processing the I/O requests redirected to the second virtual machine, send the I/O requests to the hardware device, wherein switching between the direct mode and the indirect mode comprises, to switch from the direct mode to the indirect mode, one of:

replacing a first version of a component of a first driver of the first virtual machine with a second version of the component of the first driver, the first version particular to the hardware device to transmit the I/O requests to the hardware device without passing through the second virtual machine, the second version to transmit the I/O requests to the second virtual machine over an I/O channel;

reprogramming a hardware component to direct the I/O requests from a first virtual function provided by the hardware device back to the hardware device, instead of to a second virtual function provided b the hardware device the first virtual function to receive the I/O requests from the first virtual machine the second virtual function to transmit the I/O requests directed to the second virtual function to the second virtual machine for processing.

7. The method of claim 6, wherein switching between the direct mode and the indirect mode further comprises:

to switch from the indirect mode to the direct mode, replacing the second version of the component of the first driver with the first version of the component of the first driver.

8. The method of claim 6, wherein switching between the direct mode and the indirect mode further comprises:

to switch from the direct mode to the indirect mode, reprogramming the hardware component to direct the I/O requests from the first virtual function to the second virtual function, instead of back to the hardware device, wherein a third virtual function is to receive the I/O requests from the second virtual machine, for processing by the hardware device, after the I/O requests have been processed by the second virtual machine.

9. A system comprising:

one or more computing devices;

a hardware device;

a first virtual machine implemented on a first of the computing devices to generate input/output (I/O) requests to the hardware device;

a second virtual machine implemented on a second of the computing devices;

a mechanism to switch between a direct mode and an indirect mode without switching between a first context and a second context of the hardware device, wherein in the direct mode, the I/O requests generated by the first virtual machine are to be sent to the hardware device without being redirected to the second virtual machine, wherein in the indirect mode, the I/O requests generated by the first virtual machine are to be redirected to the second virtual machine for processing, and the second virtual machine is to, after processing the I/O requests redirected to the second virtual machine, send the I/O requests to the hardware device, wherein to switch from the direct mode to the indirect mode, the mechanism is to reprogram a hardware switch to direct the I/O requests from a first virtual function to a second virtual function instead of back to the hardware device, the first virtual function to receive the I/O requests from the first virtual machine and to forward the I/O requests to a hardware component of the mechanism, the second virtual function to transmit the I/O requests direct to the second virtual function to the second virtual function for processing.

10. The system of claim 9, wherein in the indirect mode, the hardware device is to generate I/O responses to the I/O requests, the second virtual machine is to receive the I/O responses from the hardware device and is to process the I/O responses before sending the I/O responses to the first virtual machine.

11. The system of claim 9, wherein the mechanism comprises:

the first virtual function, the second virtual function, and a third virtual function that are provided by the hardware device; and, the hardware component, wherein the third virtual function is to receive the I/O requests from the second virtual machine, for processing by the hardware device, after the I/O requests have been processed by the second virtual machine, wherein the hardware component is to direct the I/O requests from the first virtual function back to the hardware device in the direct mode, and is to direct the I/O requests from the first virtual function to the second virtual function in the indirect mode, and wherein the mechanism is to switch from the indirect mode to the direct mode by reprogramming the hardware switch to direct the I/O requests from the first virtual function back to the hardware device instead of to the second virtual function.

\* \* \* \* \*

UNITED STATES PATENT AND TRADEMARK OFFICE
CERTIFICATE OF CORRECTION

PATENT NO. : 8,402,461 B2
APPLICATION NO. : 12/618746
DATED : March 19, 2013
INVENTOR(S) : Jose Renato G Santos et al.

It is certified that error appears in the above-identified patent and that said Letters Patent is hereby corrected as shown below:

In the Claims:

In column 11, line 64, in Claim 1, delete "machine" and insert -- machine, --, therefor.

In column 12, line 43, in Claim 5, delete "such" and insert -- such that --, therefor.

In column 13, line 24, in Claim 6, delete "b" and insert -- by --, therefor.

In column 13, line 25, in Claim 6, delete "device" and insert -- device, --, therefor.

In column 13, line 26, in Claim 6, delete "machine" and insert -- machine, --, therefor.

Signed and Sealed this
Third Day of September, 2013

Teresa Stanek Rea
*Acting Director of the United States Patent and Trademark Office*